April 3, 1928.  J. H. HUNTER  1,664,686
JUNCTION FITTING FOR METALLIC ARMORED ELECTRICAL CONDUCTORS
Filed April 13, 1925
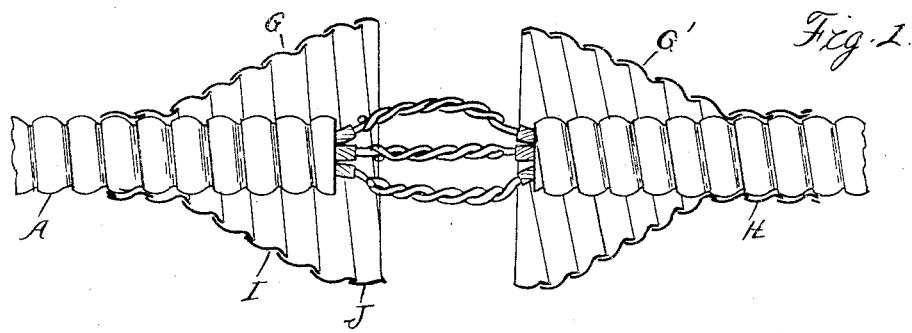
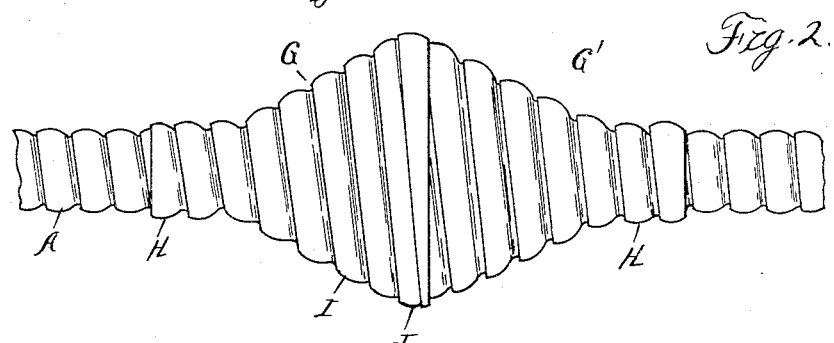
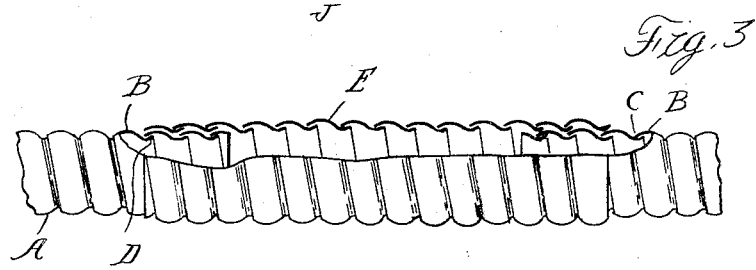
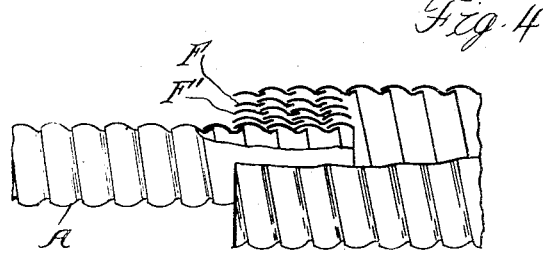
Inventor
Joseph H. Hunter
By Whittemore Hulbert Whittemore
Belknap
Attorneys Patented Apr. 3, 1928.

1,664,686

UNITED STATES PATENT OFFICE.

JOSEPH H. HUNTER, OF DETROIT, MICHIGAN, ASSIGNOR TO DETROIT INSULATED WIRE COMPANY, OF DETROIT, MICHIGAN, A CORPORATION OF MICHIGAN.

JUNCTION FITTING FOR METALLIC ARMORED ELECTRICAL CONDUCTORS.

Application filed April 13, 1925. Serial No. 22,851.

The invention relates to electrical wiring systems in armored conductors of that type in which one or more separately insulated conductors are enclosed in a flexible metallic tube. More specifically the armored tubing is formed of a spirally wound metallic strip, which strip is wound about the conductors during the process of manufacture so as to permanently encase the same. Where sections of such armored conductor are joined to each other, it is necessary to splice the individual strands or conductors and to insulate the same, which necessarily considerably enlarges the diameter at that point. My improvement is designed to mechanically join the armored sections, enclosing the insulated joint and thoroughly protecting the same as hereinafter set forth.

In the drawings:

Figure 1 is a sectional elevation showing two adjacent sections of armored conductor with sections of the junction fitting in engagement therewith, but separated for access to the conductors;

Figure 2 is an elevation showing the junction fitting closed;

Figure 3 is a view similar to Figure 1 showing a modified construction;

Figure 4 is a similar view showing another modification.

In the present state of the art insulated electrical conductors have been enclosed in an armor formed of a spirally wound metallic strip. Such strip A is fashioned to a cross section having an outwardly extending corrugation B at one edge, a concave portion C adjacent thereto and an outwardly turned flange D at the opposite edge. Thus the adjacent convolutions of the spiral winding will engage and interlock with each other while permitting sufficient freedom for relative movement to impart flexibility to the tube. Where sections of such armored conductor are to be joined, the armor is stripped back for a certain distance and the individual wires are spliced and then taped for insulation in the usual way. It is necessary, however, to provide an armor for the joint, which I accomplish as follows:

The spirally wound armor forms in effect a screw thread which may be engaged by a correspondingly threaded sleeve. Thus where there is but a single strand in the armored conductor, the joint may be encased by a threaded sleeve E, which is first screwed onto one of the armored sections and then after the splicing and insulation of the joint is screwed back to engage the other armored section. As shown in Figure 3, the tube E may be formed from a section of armor of slightly greater diameter than that used for the conductors, and if this does not provide sufficient room for the joint, a section of still larger diameter may be used, which may be engaged with the armored sections by intermediate bushings F, F', etc. If however, there are a number of separate strands or conductors within the armor which must be individually insulated or taped, a still greater diameter of coupling is required. Thus as shown in Figures 1 and 2, the coupling may be formed of two conical members G and G', each of which is preferably formed of a spirally wound strip having an outer end portion H which will threadedly engage the conduit section, a flaring portion I adjacent thereto and a portion J for threadedly engaging the cooperating section. The members G and G' may be first placed on the respective armored conductors and screwed back so as to provide room for forming the splice and insulating the same. The sections may then be screwed towards each other and finally screwed together by the portion J.

With all of the constructions described it will be noted that the coupling as well as as the conduits is flexible, thereby avoiding any possibility of localizing stresses at the joint.

What I claim as my invention is:

1. The combination with adjacent flexible electrical conduit sections, at least one of which is formed of a spirally wound strip, of a coupling between said sections also formed of a spirally wound strip having a portion threadedly engaging the spiral of said conduit section, and a flaring portion for forming an enlarged chamber.

2. The combination with adjacent flexible electrical conduit sections formed of spirally wound strips, of a coupling therebetween comprising complementary sections also formed of spirally wound strips, each section having a portion threadedly engaging conduit, and a flaring portion for forming an enlarged chamber and a portion for threadedly engaging the complementary section.

3. The combination with adjacent flexible electrical conduit sections formed of spirally wound strips, of a coupling therebetween comprising complementary sections, each having a nipple portion for threadedly engaging the conduit section, a flaring portion for forming an enlarged chamber and a portion for threadedly engaging the complementary section.

4. The combination with adjacent electrical flexible conduit sections formed of spirally wound strips, of a flexible coupling between said sections also formed of a spirally wound strip having portions engaging the spirals of said sections, the diameter of said coupling being greater than the diameter of the conduit sections whereby to provide an enlarged chamber.

In testimony whereof I affix my signature.

JOSEPH H. HUNTER.